June 14, 1966 R. L. ALTSCHULER 3,255,562
PLASTIC WALL FORMING BLOCKS AND
SPLINE CONNECTORS THEREFOR
Filed March 8, 1963 8 Sheets-Sheet 1

INVENTOR.
ROBERT ALTSCHULER
BY
ATTORNEY

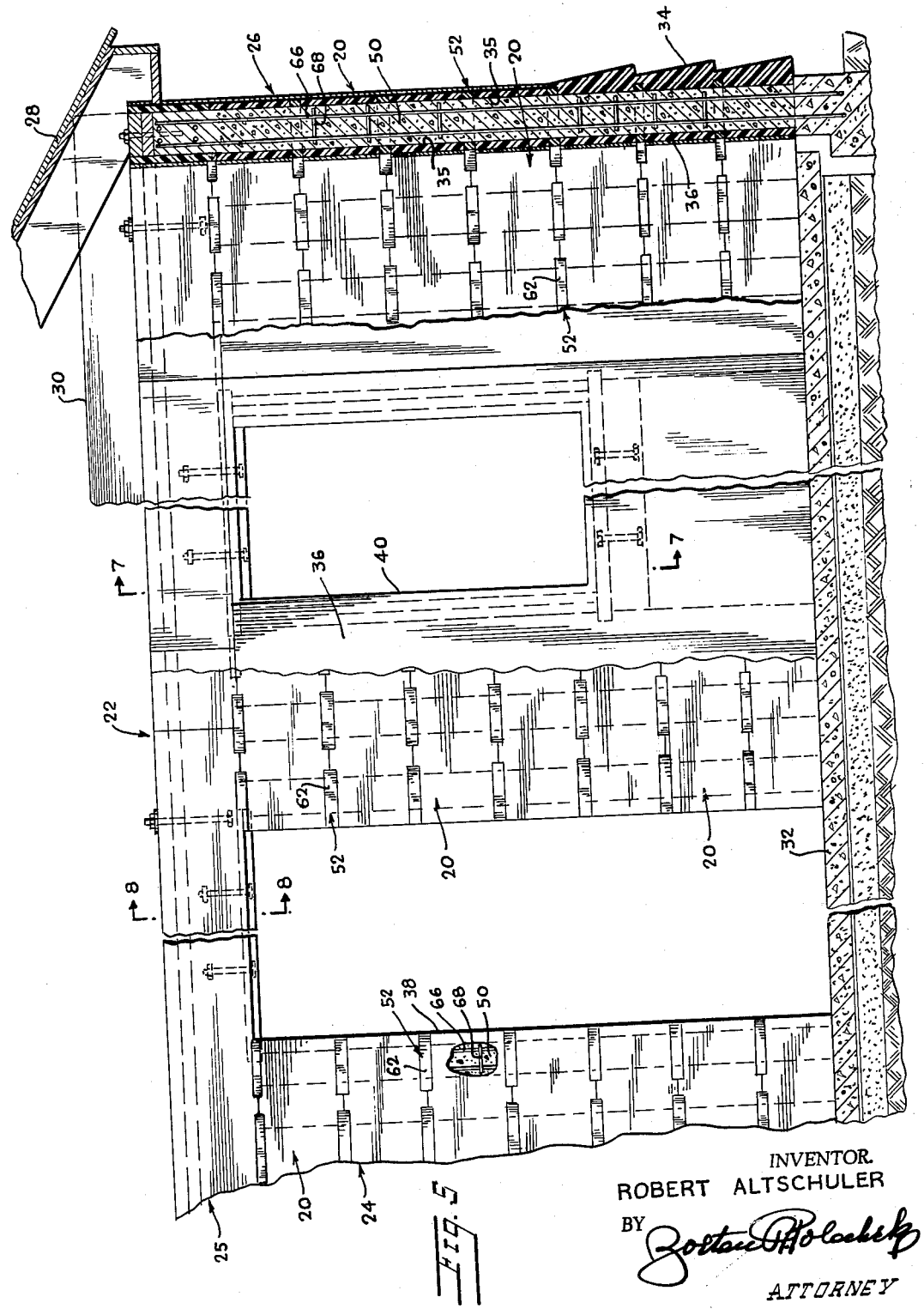

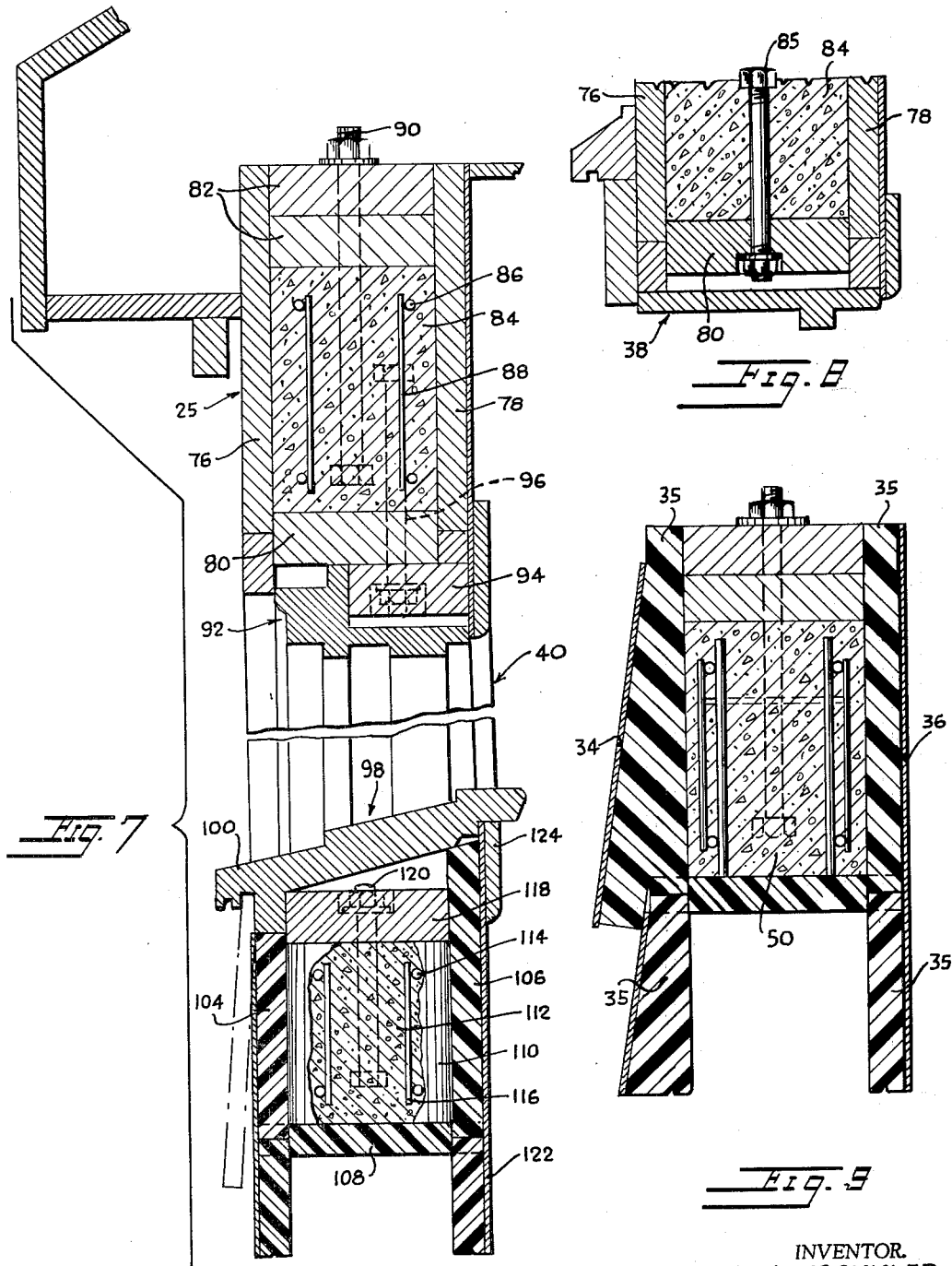

June 14, 1966  R L. ALTSCHULER  3,255,562
PLASTIC WALL FORMING BLOCKS AND
SPLINE CONNECTORS THEREFOR
Filed March 8, 1963  8 Sheets-Sheet 4
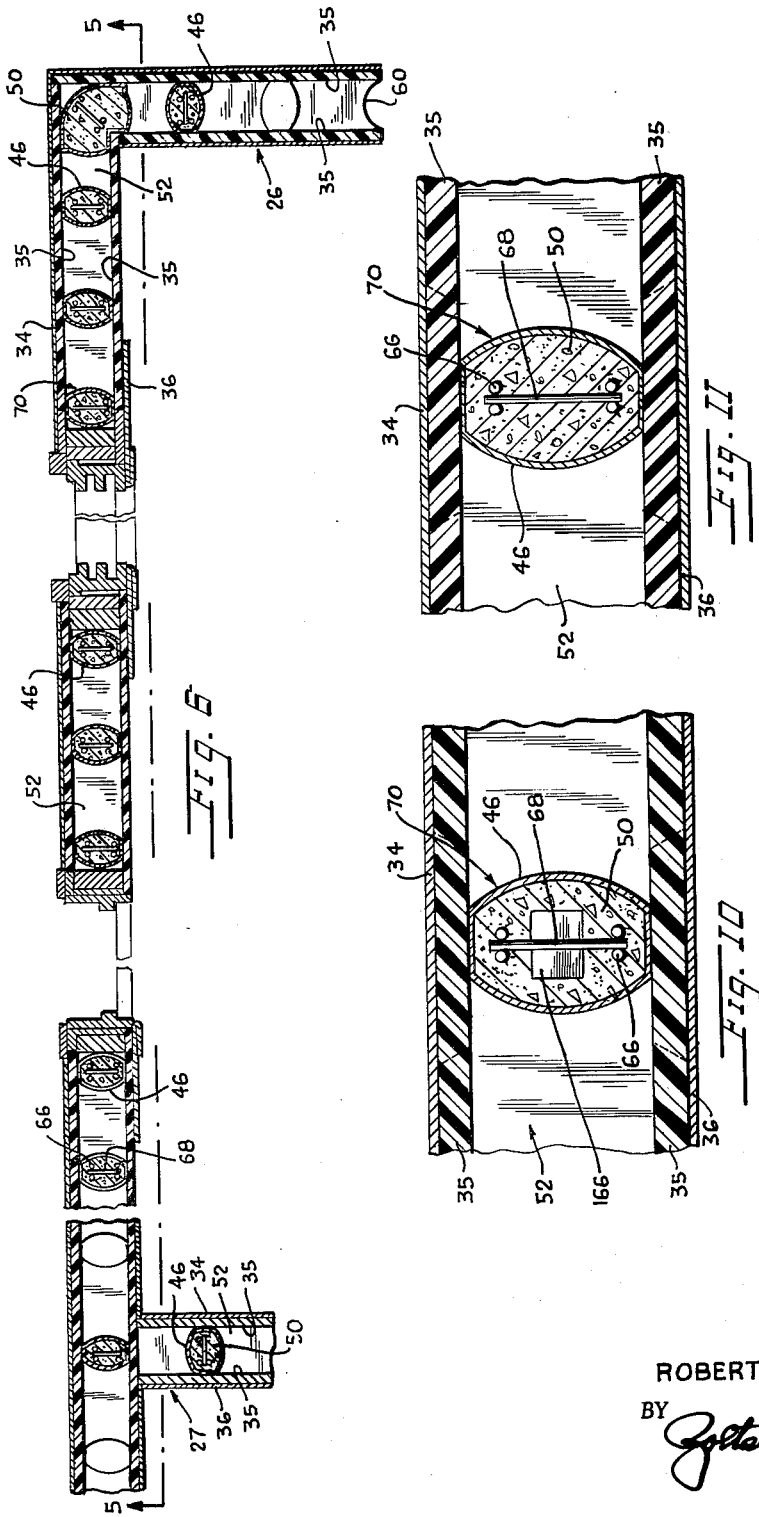
INVENTOR.
ROBERT ALTSCHULER
BY
ATTORNEY June 14, 1966  R. L. ALTSCHULER  3,255,562
PLASTIC WALL FORMING BLOCKS AND
SPLINE CONNECTORS THEREFOR
Filed March 8, 1963  8 Sheets-Sheet 5
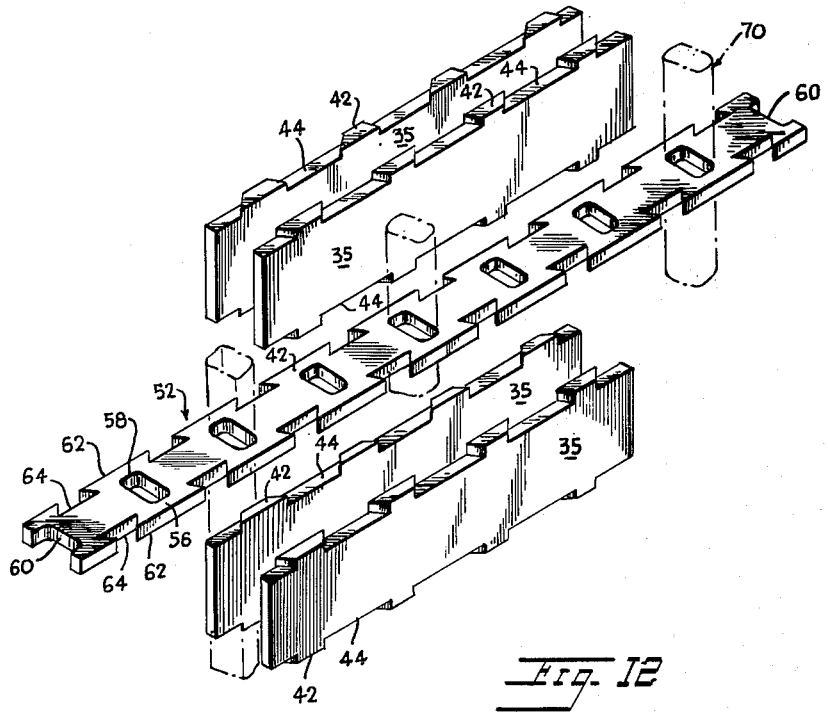
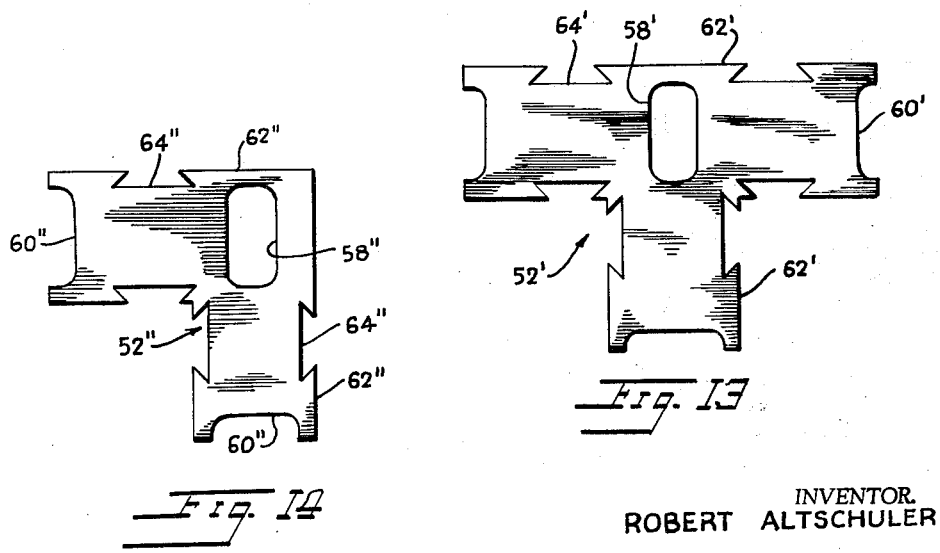
INVENTOR.
ROBERT ALTSCHULER
BY
ATTORNEY June 14, 1966  R. L. ALTSCHULER  3,255,562
PLASTIC WALL FORMING BLOCKS AND
SPLINE CONNECTORS THEREFOR
Filed March 8, 1963  8 Sheets-Sheet 6
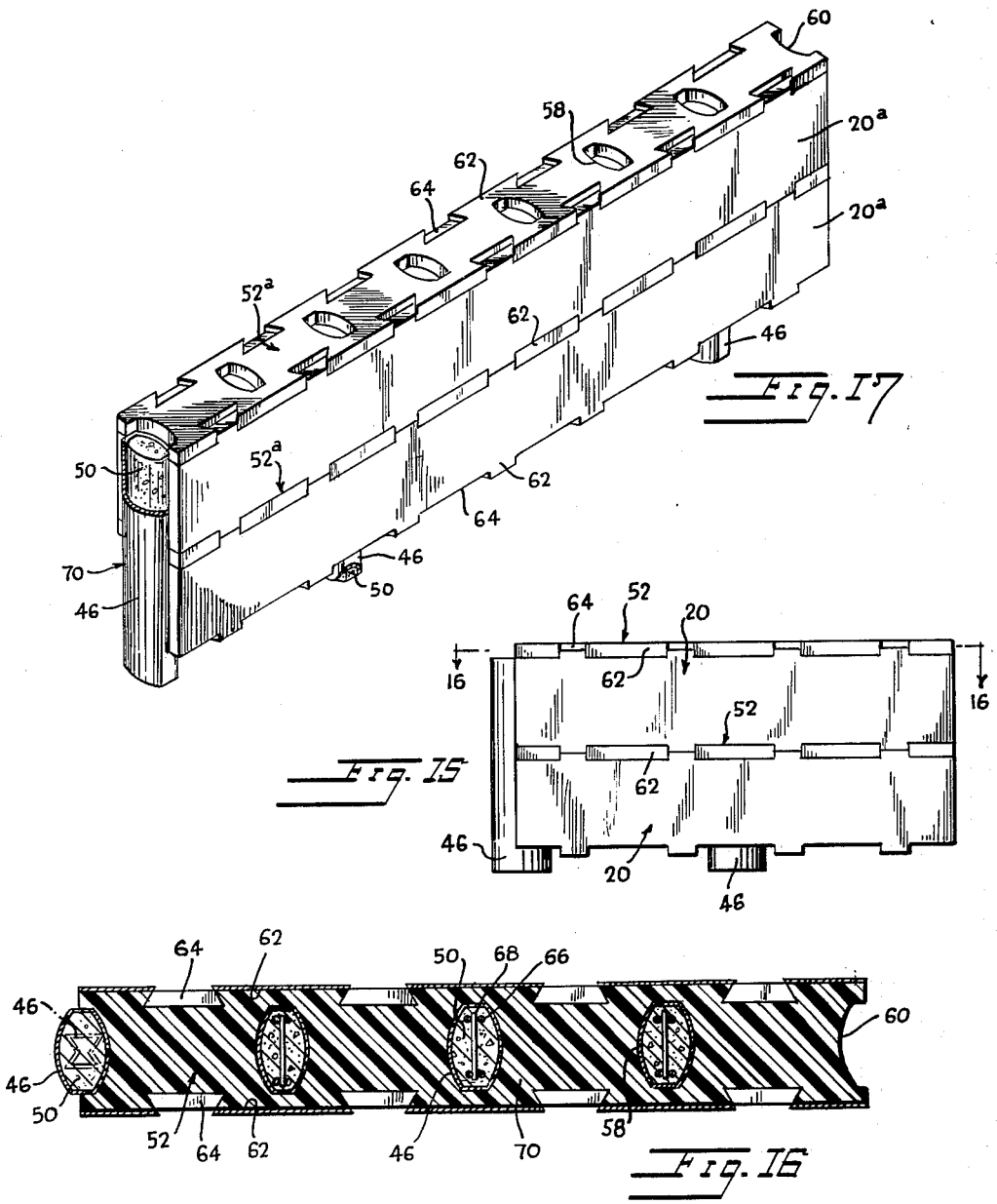
INVENTOR.
ROBERT ALTSCHULER
BY
ATTORNEY June 14, 1966  R L. ALTSCHULER  3,255,562
PLASTIC WALL FORMING BLOCKS AND
SPLINE CONNECTORS THEREFOR
Filed March 8, 1963  8 Sheets-Sheet 8
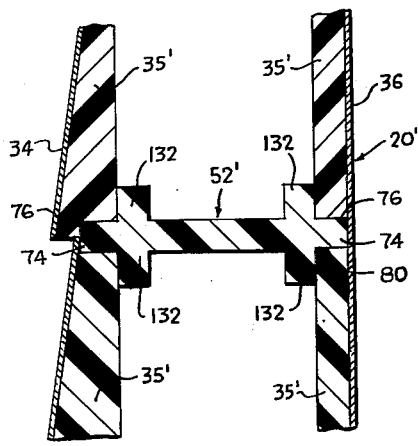
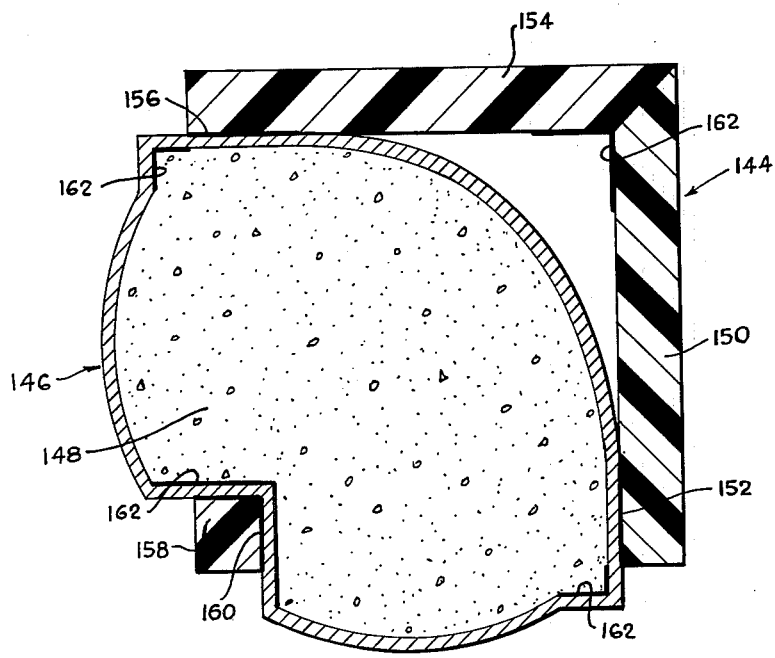
INVENTOR.
ROBERT ALTSCHULER
BY
ATTORNEY United States Patent Office 3,255,562
Patented June 14, 1966

3,255,562
PLASTIC WALL FORMING BLOCKS AND SPLINE CONNECTORS THEREFOR
Robert L. Altschuler, Wiesbaden, Germany
(2043 Crompond Road, Yorktown Heights, N.Y. 10598)
Filed Mar. 8, 1963, Ser. No. 263,816
5 Claims. (Cl. 52—309)

This invention relates to the art of building construction and more particularly to the construction of walls for buildings formed of collapsible building units with flexible webs.

According to the invention there is provided a collapsible building unit suitable for building walls, floors, ceilings and similar portions of building structures. The building unit is formed of high-strength, low-weight, rigid foam plastic material such as polystyrene, urethane or the like. The units can be laid up to form a wall and can serve as permanent forms for pouring and retaining concrete piers, cross bracing, and the like. The units each have a rigid closed cell structure having excellent insulation qualities and moisture resistance. The units are rot-proof and insect-proof. The units are easy to lay up to form a permanent building structure when properly assembled. The units may be employed to form multistory structures.

It is therefore a principal object of the invention to provide a building unit in the form of a panel or block that is collapsible.

Another object of the invention is to provide a building block of foam plastic material having flat sides with flexible tubular webs therebetween, the webs defining tubular passageways adapted to receive concrete piers.

Still another object is to provide a building block of foam plastic material having flat sides with flexible webs therebetween, the webs defining tubular passageways adapted to receive concrete piers, the long edges of the sides having dovetail extensions and recesses to coact with similar shaped extensions and recesses on a spline.

Yet another object is to provide a panel structure forming a part of a wall, ceiling, roof, or the like, which panel structure is formed of foam plastic blocks interlocked by foam plastic splines and reinforced by concrete piers.

Another object of the invention is to provide a building unit in the form of a panel or block that is made of rigid, closed cell, foam plastic material.

Another object of the invention is to provide a novel type of panel or block for use in erecting walls, the panel or block serving both as a form for poured concrete walls and as the permanent interior or exterior surface of the finished walls.

Yet another object is to provide novel means for reinforcing the panels whereby they have sufficient strength to withstand the hydrostatic pressure of concrete, poured between the panels serving as forms, without deforming, cracking or leaking, or to withstand any internal or external stresses placed upon them in use, and to provide maximum strength with minimum weight.

Yet another object is to provide a corner block of novel construction for a wall structure.

Still another object is to provide a building block formed of foam plastic material having side walls and a spacer.

It is still another object of the invention to provide a building block formed of foam plastic material having side walls and a spacer connected by a dovetail connection.

A specific object is to provide a building block having side walls and an elliptical flexible web constituting a concrete passage.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 5 is a sectional view taken on the line 5—5 of FIG. 6 showing a fragment of a building wall structure and part of a roof, the wall being made from building blocks of FIG. 1, parts being shown broken away.

FIG. 6 is a top plan view of the wall structure shown in FIG. 5.

FIG. 7 is an enlarged vertical sectional view taken on the line 7—7 of FIG. 5, parts being shown broken away and parts being omitted.

FIG. 8 is an enlarged vertical sectional view taken on the line 8—8 of FIG. 5.

FIG. 9 is a vertical sectional view of a detail of the wall structure.

FIG. 10 is a sectional view of a joint detail.

FIG. 11 is a sectional view of a stud or pier.

FIG. 12 is an exploded perspective view of a pair of building blocks and spacer connection, showing posts or piers in dot-dash lines.

FIG. 13 is a plan view of an intersecting spacer or spline used in the wall structure of FIG. 5.

FIG. 14 is a plan view of a corner spacer or spline used in the wall structure of FIG. 5.

FIG. 15 is a front elevational view of a wall embodying the blocks of FIG. 1.

FIG. 16 is a horizontal sectional view on the line 16—16 of FIG. 15.

FIG. 17 is a perspective view of a side wall embodying a modified block.

FIG. 22 is a sectional view showing the spline of FIG. 21 between the blocks of FIG. 21.

FIG. 23 is a sectional view of a corner block embodying another modified form of the invention, the block being adapted to be used with the wall structure of FIG. 5.

Figure 1:
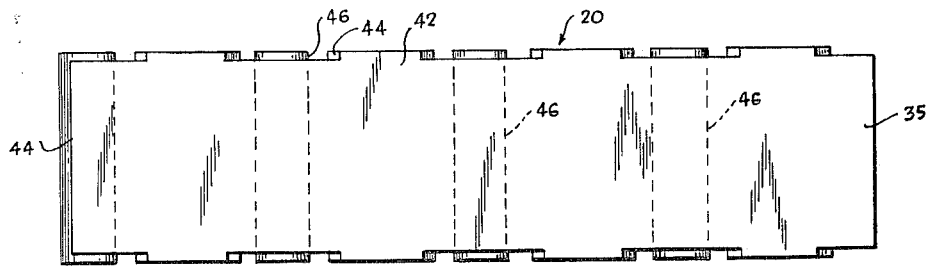
FIG. 1 is a front elevational view of a building block embodying one form of my invention.

Referring in detail to the drawings, a building structure made from blocks 20 embodying one form of the invention is illustrated in FIG. 5 and designated generally by the reference numeral 22. The structure includes a side wall 24, a header 25, an end wall 26 and a partition wall 27. A portion of a roof rafter 28 is shown above the header at one end thereof. A ceiling joist 30 tops the top of the side wall. The walls rest on a foundation 32. The outer surfaces of the walls are finished off with a cladding such as a siding or shingles 34 to make the surfaces weatherproof, and the inner surfaces of the walls are lined with cladding such as wallboard 36. The side wall is formed with a wooden door frame 38 and a wooden window frame 40.

The walls proper of the structure are formed of superimposed blocks 20, seven courses of such blocks being shown. Each block 20 comprises a pair of spaced elongated flat rectangular-shaped planks or boards formed of foam plastic material such as polystyrene, urethene or the like. The planks or boards constitute the two side walls 35, 35 of the block. The elongated edges of the blocks or boards 20 are formed with alternating dovetail extensions 42 and dovetail recesses 44. When a wall of the blocks 20 is built, the siding or facing material 34 is placed on the outer surfaces of the blocks and the wallboard 36 is placed on the inner surfaces of the blocks.

Figure 2:
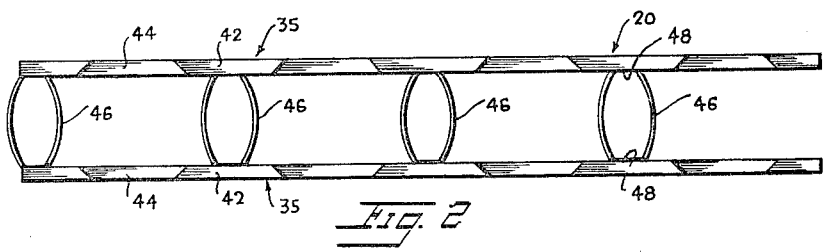
FIG. 2 is a top plan view thereof.
Figure 3:
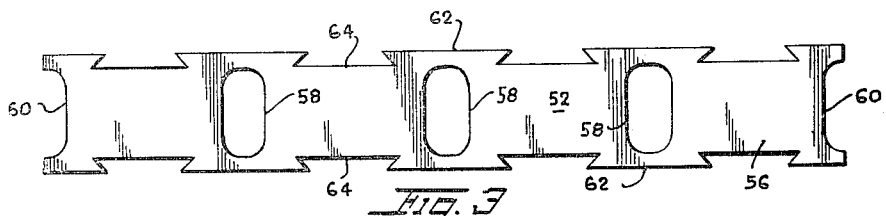
FIG. 3 is a top plan view of a spacer or spline adapted to be used with the block of FIG. 1.
Figure 4:
FIG. 4 is an edge view thereof.
Figure 2A:
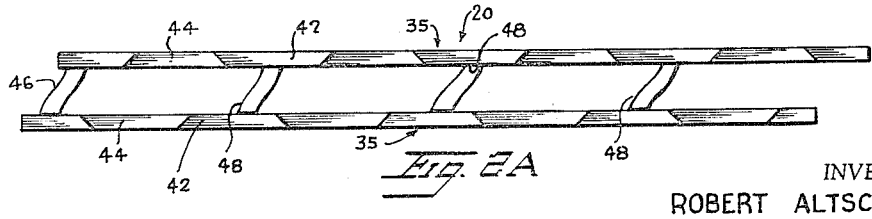
FIG. 2A is a top plan view of the block of FIG. 1 in partly collapsed condition.
Figure 18:
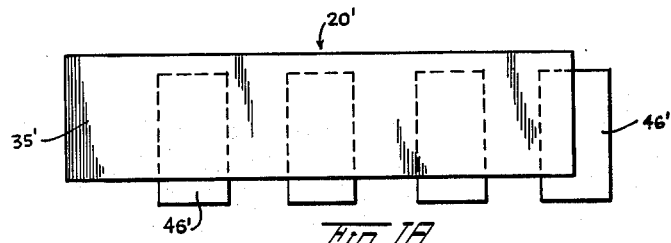
FIG. 18 is a front elevational view of a building block embodying another modified form of the invention.

A plurality of flexible hollow webs or membranes 46 are disposed in the space between the side walls 35, 35 of the block in spaced relationship. The webs or membranes are substantially elliptical or oval in cross section, with their major axes extending perpendicularly to the side walls and with their minor axes disposed parallel to the side walls. The webs or membranes are formed of canvas, flexible plastic material, waterproof cardboard, reinforced waterproof paper and the like. Each web or membrane is securely attached to the inner surfaces of the side walls 35, 35 of the block by adhesive 48, the remainder of the membrane being unattached to permit the membrane to collapse. Upon collapse of the membrane, the side walls 35, 35 of the block are pulled toward each other as shown in FIG. 2A. Each membrane has a diameter equal to the space between the side walls. However, the diameter of the membrane is distorted somewhat when it is glued to the side walls. For example, if the space between the side walls equal 5⅝" and the facing materials each equal 1", the thickness of the block would be 7⅝", the thickness of an 8" concrete block. If the glued area of the membrane is 1⅝" wide, which is the width of a dressed 2" piece of lumber, it is possible to place a 2 x 6 piece of lumber within the flexible membrane if it is desired to use lumber instead of concrete for support of the wall. When concrete 50 is poured into the membrane, the concrete pushes outwardly on the glued area 48 but this is counteracted and in fact exceeded by the pressure of the side walls 35, 35 caused by the flexible membrane 46 inherently trying to assume a circular shape.

When the blocks are superimposed on one another as in the wall structure shown in FIG. 5, the side walls 35, 35 of the blocks are held in spaced spread apart relation by a spline or spacer 52 at the top and by a similar spline at the bottom of the blocks. The spline or spacer comprises an elongated flat rectangular-shaped plate 56 of the same length as the side walls 35, 35 and formed of foam plastic material. Each spline is formed with a number of spaced openings 58 similar in shape to the cross-sectional shape of the membranes 46, and at each end the spline is formed with a semi-elliptical or semi-oval shaped recess 60. Each long edge of the spline is formed with alternating dovetail extensions 62 and dovetail recesses 64.

In the building wall structure 22 shown in FIG. 5, the side wall 24 and the end wall 26 shown are formed of superimposed blocks 20. Concrete 50 has been poured into the webs or membranes 46 of the blocks 20 and the concrete is reinforced by elongated rods 66 extending longitudinally therethrough and by intersecting cross rods 68. The membranes, concrete therein and reinforcing rods form and constitute piers or studs 70. The shape of the pier or stud 70 in cross section and the shape of the openings 58 in the splines 52 are similar and constitute an important feature of the invention. A disadvantage of blocks heretofore made was that the block became distorted caused by the pressure of the concrete when poured if the wall was built up too fast and the depth of the fluid was too great. The block 20 with the flexible web 46 utilizes the fluid pressure of the concrete to counteract the tendency of the side walls of the block to bulge. In block 20 this pressure is used to suck in the side walls 35, 35 of the block. This is accomplished by arranging for the flexible web 46 to become distorted when set in place in such fashion that when the web is filled with concrete the pier or stud 70 is elliptical or oval in shape in cross section, with the long axes thereof disposed perpendicular to the plane of the side walls 35, 35 of the blocks, and the short axes thereof disposed parallel to the plane of the side walls 35, 35 of the blocks. The fluid pressure of the poured concrete tends to force the web or membrane outwardly to a truly circular shape as the pressure is equal in all directions. The web or membrane is prevented from becoming truly circular in cross-sectional shape because the side walls 35, 35 of the block are held apart by the spacers or splines 52 between the side walls and between the blocks. Accordingly, there is a constant tension sucking in the side walls 35, 35 of the block 20 until the concrete 50 sets.

Furthermore, the spacing between the side walls 35, 35 of the block 20 may be, for example, 5⅝ inches, the thickness of a dressed 6-inch piece of lumber. The flexible web or membrane 46 is formed of a tubular piece of flexible plastic, or reinforced paper, and may be, for example, 5⅝ inches in diameter. The tubular web is fastened to the side walls 35, 35 of the block by the adhesive 48 along a line which may be, for example, 1⅝ inches wide on each of two opposed sides of the web. Thus the web cannot assume a truly circular shape. With the side walls 35, 35 of the blocks 20 held to 5⅝ inches, for example, and the web 46 being filled with concrete, the pier or stud 70 will assume the elliptical or oval shape in cross section as shown in FIGS. 10 and 11.

If the dimensions of the spacing between the side walls 35, 35 of the block is sufficient, such as above given, then a dressed piece of lumber 2 x 6 inches instead of concrete can be used as a pier. Furthermore, when the dimensions of the spacing and adhesive line are such as given above, if the adhesive line 48 should fail when the web 46 is filled with concrete, then the flexible web 46 will assume a shape circular in cross section 5⅝ inches in diameter, which will not cause the side walls 35, 35 of the block to bulge.

Further, with a block such as block 20, it is possible for the flexible web 46 to stretch slightly, as is likely to happen when the web is filled with wet concrete, without changing the thickness of the side wall.

The cladding or lining 36 on the interior surface of the side wall 24 and end wall 26 may be applied to the blocks 20 after being set in place. This cladding or lining 36, which may be composed of wallboard, plasterboard, Masonite and the like, may be applied to the block at the factory. This cladding or lining will provide more joints which may either be taped over as in the case of conventional wallboard joints or may be left to form a decorative pattern.

The cladding or shingles 34 may be placed on some of the blocks 20 of the wall, such as the end wall 26, shown in FIG. 1. This material may be applied to the outer surfaces of the blocks after the blocks are set in place or it may be applied at the factory. The shingles 34 are set one on top of the other in such a fashion that they overlap to make the wall watertight. The exterior surface of the block, however, may be molded to resemble striated shingles or may have a smooth siding with the color molded in.

The header 25 and window frame 40 of the structure shown in FIG. 5 are shown in detail in section in FIG. 7. The header comprises front and rear walls 76 and 78, respectively. A plank 80 constitutes a bottom wall and two superimposed sleepers 82, 82 constitute a top wall. Concrete 84 is poured between the front and rear walls and the bottom wall 80, and the bottom wall is anchored to the concrete by bolts 85. The concrete is reinforced by elongated rods 86 and cross rods 88. The top wall is anchored to the concrete 84 by anchor bolts 90. The window frame 40 includes a header 92 having a plank 94 secured to the concrete by anchor bolts 96.

The bottom window sill unit 98 includes the usual slanting crossboard 100 supported on spaced front and rear foam plastic walls 104 and 106, respectively, with a spacer 108 therebetween. A web 110 filled with concrete 112 is fitted between the front and rear walls, the concrete being reinforced by means of the long rods 114 and cross rods 116. A plank 118 underneath the sill board is anchored by bolts 120 to the concrete 112. The inner surface of the rear wall 106 is finished off by plasterboard 122 and with a trim piece 124.

In FIG. 13, a form of spacer or spline 52' for use at the intersection of a side wall 26 and a partition wall 27 such as shown in FIG. 6 is shown. The body of the spacer or spline is T-shaped with an elliptical opening 58' midway the ends of the top crosspiece. The body is formed with dovetail extensions 62' and dovetail recesses 64' for coaction with the dovetail edges of the side walls. The ends are formed with semi-elliptical recesses 60'.

In FIG. 14, a form of spacer or spline 52" for use at the corners of the structure between the end wall 26 and header 25, for example, is shown. The spacer 52" has an L-shaped body with dovetail extensions 62" and dovetail recesses 64" along its edges and with an elliptical opening 58" at the corner of the body. Semi-elliptical recesses 60" are formed in the ends of the body.

In FIG. 17 a modified form of wall structure made from a modified form of building blocks 20ᵃ is shown. The building blocks 20ᵃ differ from the blocks 20 of FIG. 2 merely in providing longer bodies with longer splines 52ᵃ to accommodate at least eight piers 70 instead of five. In all other respects, the wall structure is the same as the wall structure of FIG. 15 and similar reference numerals are used to indicate similar parts.

A building block 20' embodying a modified form of the invention is shown in FIGS. 18 to 22, inclusive. This block 20' differs from the block 20 in that there is no dovetail connection between the side walls 35', 35' and the spline or spacer 52', when the blocks 20' are superimposed on each other.

The long edges of the spline or spacer 52' along which the spline engages the side walls 35', 35' are formed with upper and lower flanges 132 and 132', respectively, closely spaced inwardly therefrom, and the adjacent inner edges of the side walls are notched as indicated at 74 instead of the dovetail extensions and recesses of spline 52. In all other respects the block 20' is similar to the block 20 including the web construction, and similar reference numerals are used to indicate similar parts. The spline 52' is carried straight across the block 20'. Thus, if the block 20' is 12 inches high and the spline is 1 inch thick, the walls 35', 35' of the block would each be 12 inches, minus ½ inch, minus ½ inch, or 11 inches high. Inasmuch as the spline extends straight across the full width of the block, it is necessary to provide means to locate the side walls 35', 35' inwardly and outwardly. For this purpose the spline 52' is flanged where it engages the inside of the side walls 35', 35' as shown at 132 and 132'. This is a precise measurement and serves to establish the thickness of the side wall 35'.

In order to tie the blocks 20' together laterally, the blocks 20' are set in running bond. The flexible webs 46' are lengthened about 3 inches and moved down about 1 inch. The lengthened web means that the web 46' from the block 20' above can be placed within the web 46 of the block below. When filled with concrete, the friction betwen the webs tends to keep the block from tilting over. The top of the web 46' is positioned about 1 inch below the top edge of the block in order to make it easier to set th spline 52' in place with less interference. The interlocking webs 46' also help to tie the blocks together laterally.

Figure 19:
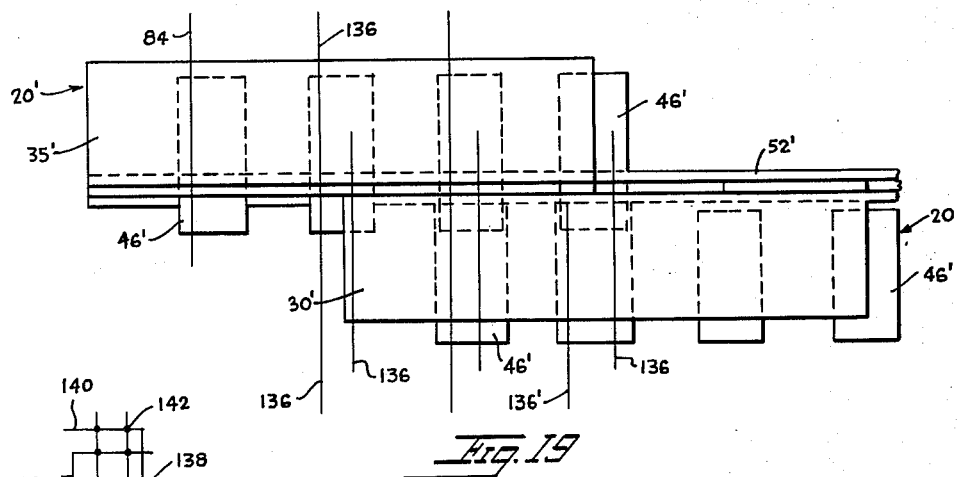
FIG. 19 is a front elevational view of a fragment of a wall embodying the blocks of FIG. 18.
Figure 20:
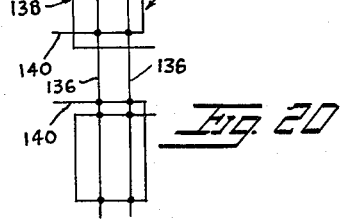
FIG. 20 is a diagrammatic view of the reinforcing means used in the wall of FIG. 19.
Figure 21:
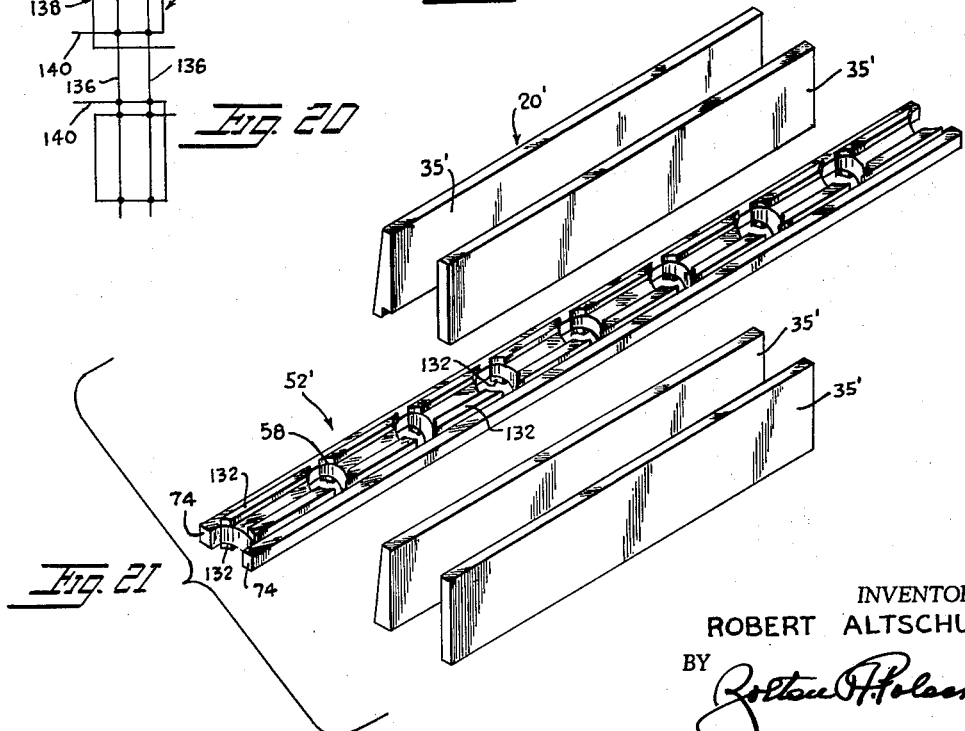
FIG. 21 is a view similar to FIG. 12 of the block of FIG. 18, with a spline, the webs being omitted.

In FIGS. 19 and 20 novel means is shown for reinforcing the concrete in the blocks 20'. The webs 46' or concrete passages are filled with concrete 50 as the blocks are laid up. Concrete set up in successive lifts does not always bond too well and in effect the concrete column formed may actually be a series of blocks set one on top of another. Therefore, steel reinforcing is used in the concrete. The reinforcing has the effect of making the combined concrete and steel much stronger than if each were used separately. Spread out on a per block basis the cost of the reinforcing steel is very inexpensive. The reinforcing is designed to help with the vertical alignment of the blocks and to hold the blocks in place so that the blocks are not accidentally displaced before the concrete sets. The reinforcing units is designed to be about twice the height of one block. The reinforcing when placed is staggered so that in effect the reinforcing is double for every concrete filled column or pier. The novel reinforcing unit comprises a pair of heavy elongated reinforcing rods 136 held in spaced relation by lighter wire frames 138 which also help to align the blocks. The wire frames 138 are U-shape with pointed free ends 140 and are fastened to the rods 136 by welding as indicated at 142. When the webs 46' are filled with concrete and the side walls 35', 35' are sucked inward by the pressure of the concrete, the side walls 35', 35' become impaled on the pointed ends 140 and thus kept from moving vertically.

The placement of the pointed free ends 140 is important. For example, consider that a row of blocks 20' has been placed and the blocks are half filled with concrete 50. The reinforcing unit including the rods 136 and wire frames 138 is slipped into the web 46' of the block placed. This reinforcing unit goes only half way down the block since the side walls 35', 35' of the block 20' have been sucked inwardly by the pressure of the concrete and accordingly there are no pointed free ends 140 on the lower one quarter of the reinforcing unit. The next superimposed block is placed over the reinforcing unit of the block below. The side walls 35', 35' of said superimposed block are spread apart to clear the pointed free ends 140. When in place, the pressure on the side walls of the superimposed block is released and the side walls become impaled on the free ends 140 and the webs 46' or concrete pasages are filled halfway with concrete 50 and the process continues. For the lowermost row of blocks, the reinforcing may start in the foundation 32.

In constructing a wall structure formed of the improved blocks, it is desirable to have some ready-made prefabricated solution for making inside and outside corners, rather than to cut and fit a regular block to go around a corner. For this purpose, I have designed a corner block that can be made to fit into the modular scheme of the wall blocks and can be made to have a larger cross-sectional area for the concrete channel in order to supply a stronger concrete pier, stud or column, at the corner where more strength ordinarily is needed. It may also be desirable to combine the corner blocks of each corner into a corner post, which post may be braced and guyed and plumbed and be used as guys for alignment of the other blocks in the wall which is to be set up.

In carrying out the invention, a corner block unit 144 shown in FIG. 23 is provided. If the corner block unit 144 is used as a corner post, the plastic pieces will extend the full height of the wall, usually 8 feet. Shingles or siding or whatever other means is placed on the outer surface of the side walls of the blocks are placed on the plastic pieces. If used as a corner post, the flexible webs should be put on in pieces to match the height of the blocks that will be used with the posts. The web 146 of each superimposed block is to fit into the web 146 of the block below a distance of about 2 to 3 inches so that when pouring concrete the web above, where the pour is to be made, is simply pushed back and the concrete poured through a small drop rather than from the top of the column. The corner block unit 144 can be shipped knocked down or folded flat. Unfolding of the unit, setting of the unit in place and filling the web 146 of the unit with concrete 148 provides the block unit with the shape and strength to perform its intended purpose and function. The flexible web 146 of the unit differs in shape and construction from the webs 46. Web 146 is elbow-shaped caused by the pressure of the concrete. The body of the web is fixed to the vertical wall 150 for a short distance by adhesive as indicated at 152 and is fastened to the top horizontal wall 154 at one end by adhesive as indicated at 156. The side of the web opposite the point where fastened by adhesive 152 is fastened to a timber 158 by adhesive 160. L-shaped reinforcing plates 162 and 162' are secured at the corners of the vertical and horiozntal walls and web corners, respectively, in order to carry the stresses around the corners.

The invention also contemplates the use of a shear key 166 extending through the pier 70, at the joint, if desired, as shown in FIG. 10.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A building wall structure comprising a plurality of courses of superimposed building blocks, each of said blocks including a pair of spaced rectangular-shaped boards of foam plastic material spaced tubular flexible webs fastened to the inner faces of the boards and extending across the boards, said webs connecting the boards in parallel relationship to each other, said webs being in alignment and interlocked, concrete filling said webs, the long edges of the boards having alternating grooves forming dovetail extensions and dovetail recesses therealong, and splines disposed between the long edges of adjacent boards, said splines having alternating dovetail extensions and dovetail recesses coacting with the dovetail extensions and recesses of the boards for holding the boards in spaced parallel and interlocked relation.

2. A building wall structure comprising a plurality of courses of superimposed building blocks, each of said blocks including a pair of spaced rectangularly-shaped boards of foam plastic material spaced tubular flexible webs fastened to the inner faces of the boards and extending across the boards, said webs connecting the boards is parallel relationship to each other, said webs being in alignment and interlocked, concrete filling said webs, the long edges of the boards having alternating grooves forming dovetail extensions and dovetail recesses therealong, and splines disposed between the long edges of adjacent boards, said splines having alternating dovetail extensions and dovetail recesses coacting with the dovetail extensions and recesses of the boards for holding the boards in spaced parallel and interlocked relation, said splines having spaced openings to receive said concrete filled webs.

3. A building wall structure comprising a plurality of courses of superimposed building blocks, each of said blocks including a pair of spaced rectangular-shaped boards of foam plastic material spaced tubular flexible webs fastened to the inner faces of the boards and extending across the boards, said webs connecting the boards in parallel relationship to each other, said webs being in alignment and interlocked, concrete filling said webs, said boards having notches along the adjacent inner long edges thereof, and splines disposed between the long notched edges of adjacent boards, said splines having spaced openings to receive said webs, the long edges of said splines interlocked with the notches in the blocks for holding the boards in spaced parallel and interlocked relation.

4. A building wall structure comprising a plurality of courses of superimposed building blocks, each of said blocks including a pair of spaced rectangular-shaped boards of foam plastic material spaced tubular flexible webs fastened to the inner faces of the boards and extending across the boards, said webs connecting the boards in parallel relationship to each other, said webs being in alignment and interlocked, concrete filling said webs, said boards having notches along the adjacent inner long edges thereof, and splines disposed between the long edges of adjacent boards, said splines having spaced openings to receive said webs, the long edges of said splines interlocked with the notches in the blocks for holding the boards in spaced parallel and interlocked relation, and flanges along the splines closely spaced inwardly from the long edges thereof.

5. A building wall structure comprising a plurality of courses of superimposed building blocks, each of said blocks including a pair of spaced rectangular-shaped boards of foam plastic material spaced tubular flexible webs fastened to the inner faces of the boards and extending across the boards, said webs connecting the boards in parallel relationship to each other, said webs being in alignment and interlocked, concrete filling said webs and constituting piers, said boards having notches along the adjacent inner long edges thereof, splines disposed between the notched long edges of adjacent boards, said splines having spaced openings to receive said webs, the long edges of the splines interlocked with the notches for holding the boards in spaced parallel and interlocked relation, and means for reinforcing said piers, said means including elongated rods extending lengthwise of the piers and U-shaped wire frames extending across and intersecting said long rods.

References Cited by the Examiner

UNITED STATES PATENTS

| | | | |
|---|---|---|---|
| 1,427,372 | 8/1922 | Geraerdts | 52—715 |
| 1,785,067 | 12/1930 | Bemis | 52—258 |
| 2,351,615 | 6/1944 | James | 52—258 |
| 3,112,532 | 12/1963 | Slowinski | 52—618 |

FOREIGN PATENTS

| | | |
|---|---|---|
| 532,745 | 11/1956 | Canada. |
| 539,548 | 4/1922 | France. |
| 757,418 | 9/1956 | Great Britain. |

FRANK L. ABBOTT, *Primary Examiner.*

CHARLES E. O'CONNELL, *Examiner.*

D. R. COMUZZI, *Assistant Examiner.*